P. BROADBOOKS.
Pruning-Shears.

No. 137,821. Patented April 15, 1873.

Witnesses:
H. W. Graham
J. C. Wilson

Inventor:
Peter Broadbooks

UNITED STATES PATENT OFFICE.

PETER BROADBOOKS, OF BATAVIA, NEW YORK, ASSIGNOR OF ONE-HALF HIS RIGHT TO CHARLES N. GROVE, OF SAME PLACE.

IMPROVEMENT IN PRUNING-SHEARS.

Specification forming part of Letters Patent No. 137,821, dated April 15, 1873; application filed March 15, 1873.

*To all whom it may concern:*

Be it known that I, PETER BROADBOOKS, of Batavia, in the county of Genesee and State of New York, have invented certain Improvements in Pruning-Shears, of which the following is a specification:

My invention relates to pruning-shears having several cutting-edges, which may be utilized by shifting the parts so as to bring the several edges into use; and also, by shifting the position of the handle with reference to the cutting-blade, more or less leverage may be given and the shears opened more or less, as may be required, in cutting limbs of various sizes.

Figure 1:
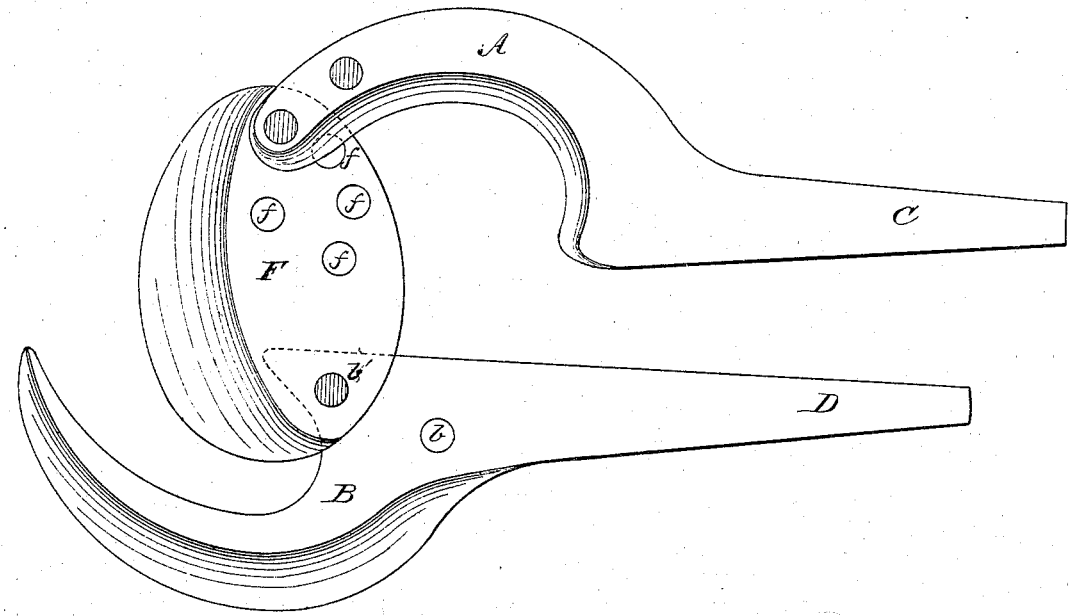
Figure 2:
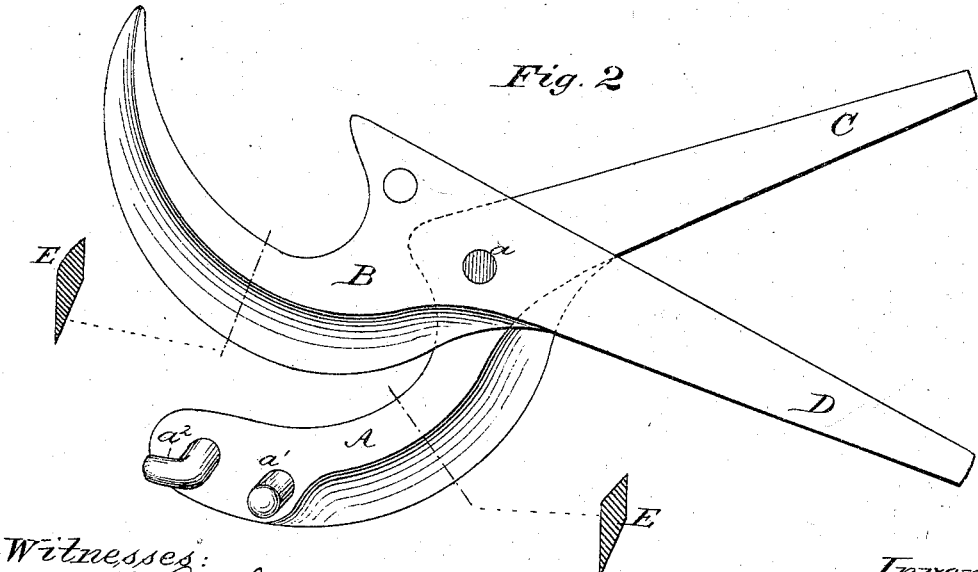

Referring to the drawing, A and B represent two hook-shaped blades, having shanks C D, the blades being beveled, as shown in cross-section at E E, Figure 2, so as to form cutting-edges on both sides. On the heel of blade A is a stud, $a$, which fits into the perforation $b$ in the heel of B, so that when the blades are placed together, using the stud $a$ as a pivot, the shears are formed, as shown in Fig. 2. F is a cam-shaped blade, having a series of perforations, $f$, and a cutting-edge, as shown in Fig. 1. On the heel of blade B is a stud, $b'$, which serves as a pivot for the cam-shaped blade F. On the blade A is a stud, $a^1$, and a hook, $a^2$. To work the cam-blade the hook $a^2$ may be placed in either of the perforations $f$ on the outer edge of the blade; or it may be placed in the central one, and the stud $a^1$ in either of the perforations on the outer edge. This change may be made while using the implement; and it will thus be seen that it can be accommodated to the various-sized limbs with varying degrees of leverage.

By making one of the studs $a$ or $b'$ removable and using the other as a pivot the shears may be put together so as to use the reverse edges of the hook-blades from those shown to be in use in Fig. 2.

Either long or short handles may be attached to the shanks.

It will be seen that my shears are capable of great variety of use by shifting the various parts.

What I claim as my invention is—

The combination of the blades A, B, and F, as described, A being furnished with hooks and B and F with perforations, whereby the blades B and A may be used either with or without the blade F, all substantially as herein shown and described.

PETER BROADBOOKS.

Witnesses:
H. W. GRAHAM,
J. C. WILSON.